(12) United States Patent
Taylor-Smith

(10) Patent No.: US 7,563,828 B2
(45) Date of Patent: Jul. 21, 2009

(54) SOLID STATE PROTON CONDUCTOR SYSTEM DERIVED FROM HYBRID COMPOSITE INORGANIC-ORGANIC MULTICOMPONENT MATERIAL

(75) Inventor: Ralph Taylor-Smith, Watchung, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1014 days.

(21) Appl. No.: 10/892,979

(22) Filed: Jul. 16, 2004

(65) Prior Publication Data

US 2006/0014877 A1    Jan. 19, 2006

(51) Int. Cl.
*B01J 41/12* (2006.01)
*H01M 4/86* (2006.01)

(52) U.S. Cl. .............. 521/30; 429/29; 429/33

(58) Field of Classification Search ........... 429/29, 429/33; 521/30
See application file for complete search history.

(56) References Cited

U.S. PATENT DOCUMENTS

| | | | |
|---|---|---|---|
| 5,739,180 A | 4/1998 | Taylor-Smith | 523/203 |
| 5,965,202 A | 10/1999 | Taylor-Smith et al. | 427/245 |
| 6,184,968 B1 | 2/2001 | Taylor-Smith | 349/158 |
| 6,187,427 B1 | 2/2001 | Taylor-Smith et al. | 428/305.5 |
| 6,268,089 B1 | 7/2001 | Chandross et al. | 430/1 |
| 6,313,219 B1 | 11/2001 | Taylor-Smith | 524/853 |
| 6,375,912 B1 | 4/2002 | Taylor-Smith | 423/240 R |
| 6,878,475 B2 * | 4/2005 | Wixom et al. | 429/33 |
| 2004/0137241 A1 | 7/2004 | Lin et al. | 428/447 |
| 2005/0053818 A1 * | 3/2005 | St-Arnaud et al. | 429/30 |
| 2006/0182492 A1 * | 8/2006 | Keller | 403/170 |
| 2006/0194096 A1 * | 8/2006 | Valle et al. | 429/42 |

FOREIGN PATENT DOCUMENTS

| | | |
|---|---|---|
| EP | 1 491 546 | 12/2004 |
| EP | 1 550 664 | 7/2005 |
| WO | WO2004/026883 | 4/2004 |

OTHER PUBLICATIONS

Honma et al., *Solid State Ionics* 162-163:237-245 (2003).
Honma et al., *Journal of The Electrochemical Society* 150:A616-A619 (2003).
Honma et al., *Solid State Ionics* 120:255-264 (1999).
Nakajima et al., *Journal of The Electrochemical Society* 149:A953-A959 (2002).
Harrison, *Journal of Organometallic Chemistry* 542:141-183 (1997).
Alberti et al., *Journal of Membrane Science* 172:233-239 (2000).
Gautier-Luneau et al., *Electrochimica Acta* 37:1615-1618 (1992).
Rikukawa et al., *Prog. Polym. Sci.* 25:1463-1502 (2000).
Norby, *Solid State Ionics* 125:1-11 (1999).

* cited by examiner

*Primary Examiner*—Bernard Lipman

(57) ABSTRACT

A polysesquioxane composition, comprising (i) a polysesquioxane matrix comprising sesquioxane moieties comprising a metallic element; (ii) a hydrophilic component; and (iii) a proton-conducting component, is provided. The metallic element can be silicon, aluminum, titanium, zirconium, germanium, or a mixture of two or more thereof. The hydrophilic component can comprise an imidazole moiety, a pyrazole moiety, a benzimidazole moiety, a silanol moiety, a cyclodextrin, or two or more thereof, and the hydrophilic component can be covalently bonded to the polysesquioxane matrix. The proton-conducting component can comprise an inorganic Brønsted acid moiety. The polysesquioxane composition can be used as a proton exchange membrane in a fuel cell; as a component of a membrane electrode assembly; or as a sensor assembly in a potentiometric sensor.

16 Claims, 14 Drawing Sheets

*Cyclic Oligosaccharides (Cyclodextrins) (~ 7 Å)*

*Polyhedral Oligomeric Silsesquioxanes (~ 15 Å)*

Conductivity for Phenyl-Sulfonated POSS-Cyclodextrin-Poly(Phenyl-silsesquioxane)

Polarization Plot for POSS-Cyclodextrin-Poly(Phenyl-silsesquioxane)

Power Density for
POSS-Cyclodextrin-Poly(Phenyl-silsesquioxane)

SOLID STATE PROTON CONDUCTOR SYSTEM DERIVED FROM HYBRID COMPOSITE INORGANIC-ORGANIC MULTICOMPONENT MATERIAL

BACKGROUND OF THE INVENTION

1. Field of the Invention

The present invention relates generally to the fields of proton conductors. More particularly, the present invention relates to solid-state proton exchange membranes.

2. Description of the Related Art

Fuel cells are electrochemical devices that convert chemical energy directly into electrical energy. Generally, the fuel cell comprises an anode, at which electrons are catalytically removed from the fuel and fed to an external circuit, and protons are catalytically removed from the fuel and fed across a proton exchange membrane to a cathode, where the electrons, protons, and an oxidant are recombined to close the circuit.

Fuel cells require hydrogen, but as is known, free hydrogen is highly reactive. Therefore, there has been interest in fuel cells that extract hydrogen from another fuel at the anode. One fuel of interest is methanol ($CH_3OH$), which can be readily transported as a liquid and has a relatively high energy capacity (e.g., assuming 50% efficiency, 250 mL methanol can deliver about 600 watt-hours of electricity). Ethanol ($CH_3CH_2OH$) can also be used; its energy capacity is somewhat lower than that of methanol, but ethanol is far less toxic if imbibed or otherwise absorbed. Methanol or ethanol can be oxidized at the anode by exposure to an oxidant, typically oxygen from air, in the presence of a catalyst, producing $CO_2$, $H^+$, and $e^-$. The skilled artisan will understand this description is not stoichiometric.

Among the challenges faced by methanol- or ethanol-fueled fuel cells are the optimization of the properties of the proton exchange membrane. The membrane should efficiently conduct protons from the anode to the cathode to complete the circuit. The membrane also should have a low methanol permeation rate, both to enhance the efficiency of methanol oxidation at the anode and to minimize the reduction of cathode potential by oxidation of methanol at the cathode.

One area of particular interest are medium temperature fuel cells, by which is meant those suitable for use at temperatures from about 100° C. to about 250° C. To operate at such a fuel cell temperature, a proton exchange membrane should have a high thermal stability. However, thermal stability is typically inversely correlated with proton conductivity, e.g., a material with a high thermal stability generally has a low proton conductivity.

SUMMARY OF THE INVENTION

In one embodiment, the present invention relates to a polysesquioxane composition, comprising (i) a polysesquioxane matrix comprising sesquioxane moieties comprising a metallic element; (ii) a hydrophilic component; and (iii) a proton-conducting component.

In another embodiment, the present invention relates to a fuel cell, comprising an anode; a fuel source capable of feeding a fuel to the anode; a proton exchange membrane comprising a polysesquioxane composition comprising: (i) a polysesquioxane matrix comprising sesquioxane moieties comprising a metallic element; (ii) a hydrophilic component; and (iii) a proton-conducting component; a cathode; and an oxidant source capable of feeding an oxidant to the cathode.

In an additional embodiment, the present invention relates to a process for making a polysesquioxane composition, comprising reacting a sesquioxane precursor comprising a metallic element, to form a polysesquioxane matrix; incorporating a hydrophilic component into the polysesquioxane matrix; and incorporating a proton-conducting component into the polysesquioxane matrix, to yield the polysesquioxane composition. The polysesquioxane composition can exhibit enhanced proton conductivity in the solid state.

The polysesquioxane composition of the present invention can be used in fuel cells as a proton exchange membrane that both conducts protons from the anode to the cathode with high efficiency and has a low methanol permeation rate. It can also be used as a solid state proton conducting medium in potentiometric sensors, among other uses.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

In one embodiment, the present invention relates to a polysesquioxane composition, comprising:
(i) a polysesquioxane matrix comprising sesquioxane moieties comprising a metallic element;
(ii) a hydrophilic component; and
(iii) a proton-conducting component.

A "sesquioxane moiety" as used herein refers to an arrangement of atoms wherein a first atom of a metallic element is covalently bonded to an oxygen atom, the oxygen atom is also covalently bonded to a second atom of a metallic element, and the first atom of a metallic element is also covalently bonded to a carbon atom. In any one sesquioxane moiety, the first atom of a metallic element and the second atom of a metallic element can be of the same metallic element or different metallic elements. In one embodiment of the polysesquioxane composition, the metallic element is silicon, aluminum, titanium, zirconium, germanium, or a mixture of two or more thereof. In a further embodiment, the metallic element is silicon. In this further embodiment, the composition and matrix may be referred to as a "polysilsesquioxane."

The carbon atom of the sesquioxane moiety can be a component of any hydrocarbon moiety, substituted hydrocarbon moiety, aromatic moiety, or substituted aromatic moiety.

A "sesquioxane precursor" as used herein is a compound comprising a first atom of a metallic element, at least one oxygen atom bonded to the first atom of the metallic element, and at least one carbon atom bonded to the first atom of the metallic element. The oxygen atom can be present in an alkoxy moiety, such as methoxy, ethoxy, or propoxy, among others. The polysesquioxane matrix can be considered as the product of the covalent reaction of sesquioxane precursors to form a polymer.

Figure 2:
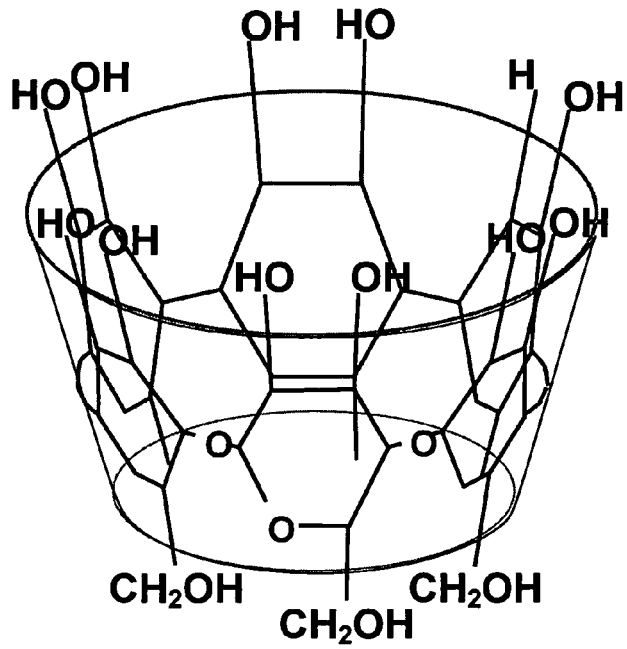
FIG. 2 shows structural formulas of both a cyclodextrin and a polyhedral oligomeric silsesquioxane (POSS) molecule.
Figure 2:
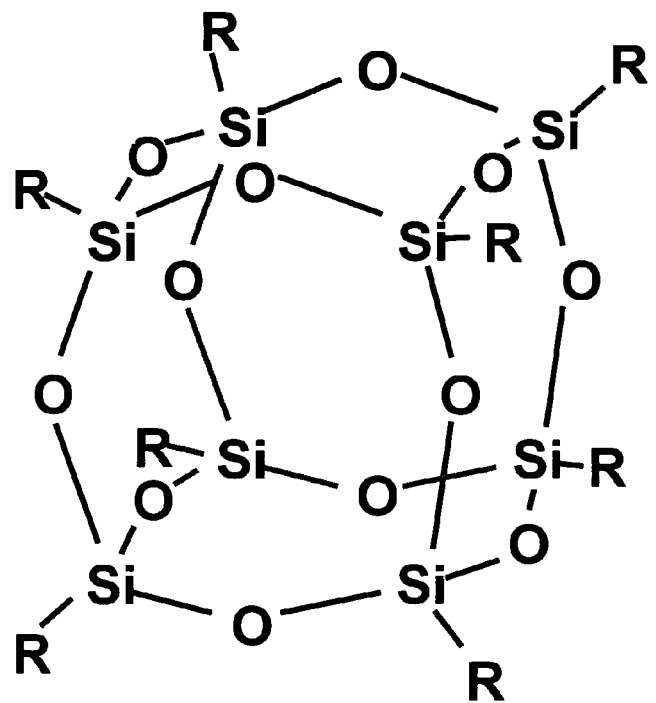

In addition to the sesquioxane moieties, the polysesquioxane matrix can further comprise other moieties, such as Metal-OH, Metal-Halide, Metal-Hydrocarbon, Metal-Hydrocarbon-Metal, or Metal-Aryl-Metal, among others known to the skilled artisan, wherein "Metal" represents an atom of a metallic element, "Halide" represents an atom of Group VIIA of the Periodic Table, "Hydrocarbon" represents a moiety having one or more carbon atoms, and "Aryl" represents a moiety having one or more aromatic moieties. (In this context, "Aryl" is a subset of "Hydrocarbon"). A polysesquioxane matrix comprising a Metal-Hydrocarbon-Metal moiety or a Metal-Aryl-Metal moiety, wherein each Metal is bonded to a carbon atom (which may be the same carbon atom or different carbon atoms), may be referred to as a "bridged polysesquioxane." Alternatively or in addition, the polysesquioxane matrix can comprise polyhedral oligomeric sesquioxane (POS) moieties, which are caged structures having the general formula $(RMetalO_{1.5})_n$, wherein R=cyclic $C_5H_{10}$ or cyclic $C_6H_{12}$, and n is an even integer greater than or equal to 6. An exemplary polyhedral oligomeric sesquioxane (POS) moiety wherein the metal is silicon (i.e., a polyhedral oligomeric silsesquioxane (POSS) moiety) and n=8 can be derived from a POSS molecule as shown in FIG. 2.

The size of the Hydrocarbon moieties determines the size of the unit cell and hence the porosity of the polysilsesquioxane matrix. Depending on the metallic element, the types and proportions of moieties present in the polysesquioxane matrix, processing parameters used in the preparation of the polysesquioxane matrix, among other parameters, the matrix can have pore diameters in the range of from about 30 Å to about 100 Å. Though not to be bound by theory, pore diameters in this range may enhance the proton conductivity of the polysesquioxane matrices of the present invention.

The word "or," wherever it is used herein, has the inclusive meaning.

In one embodiment, the Halide is fluorine. In a further embodiment, the polysesquioxane matrix has a high fluorine content, by which is meant greater than 25 mole % of the atoms bonded to carbon atoms in the polysesquioxane matrix are fluorine.

The polysesquioxane composition also comprises a hydrophilic component. "Hydrophilic component" refers to a moiety or a molecule that is capable of forming hydrogen bonds with water. In one embodiment, the hydrophilic component comprises an imidazole moiety having the structure

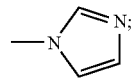

a pyrazole moiety having the structure

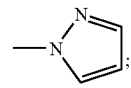

a benzimidazole moiety having the structure

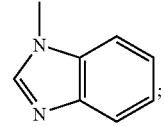

a silanol moiety having the structure —$SiX_2OH$, wherein each X is independently H, halide, hydrocarbon, or silyl; a cyclodextrin having the structure

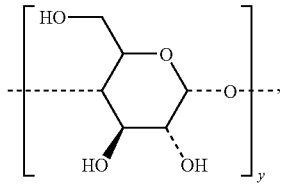

wherein y is an integer from 6 to 8, inclusive; or two or more thereof. In the foregoing structures, the unfilled valences represent bonds to H, Halide, Hydrocarbon, Silyl (a moiety having one or more silicon atoms), or an atom of the polysesquioxane matrix, such as an atom of the metallic element or an atom of an oxygen, Hydrocarbon, Aryl, Silyl, or other moiety bonded to an atom of the metallic element.

It may be desirable to immobilize the hydrophilic component in the polysesquioxane matrix. In one embodiment, the hydrophilic component is covalently bonded to the polysesquioxane matrix. The covalent bond can be to an atom of the metallic element or to an atom of an oxygen, Hydrocarbon, Aryl, Silyl, or other moiety bonded to an atom of the metallic element. In another embodiment, the hydrophilic component is vitrifiedly immobilized in the polysesquioxane matrix, i.e., the hydrophilic component and the polysesquioxane matrix are fixed in position relative to each other by holding the composition at a temperature significantly below the glass transition temperature of the polysesquioxane matrix. At such temperatures, the composition feels glassy and is highly viscous. The glass transition temperature of a polysesquioxane matrix can be determined as a routine matter by the skilled artisan having the benefit of the present disclosure.

The polysesquioxane composition also comprises a proton-conducting component. A "proton-conducting component" is a moiety, a molecule, or a plurality of moieties or molecules that is or are capable of proton association and dissociation. The proton-conducting component can comprise a moiety covalently bonded to the polysesquioxane matrix, a moiety covalently bonded to the hydrophilic component, a molecule, an oligomer or polymer of multiple molecules, or two or more thereof. In one embodiment, the proton-conducting component comprises an inorganic Brønsted acid moiety. An "inorganic Brønsted acid moiety" is a moiety capable of proton association and dissociation, wherein the atom to which protons can associate and from which protons can dissociate is not carbon and is not bonded to a carbon atom.

In one embodiment, the proton-conducting component is monododecylphosphate ($H_2PO_4(CH_2)_{11}CH_3$), phosphotungstic acid ($aWO_3 \cdot H_3PO_4 \cdot bH_2O$, wherein a is an integer from about 10 to about 14 and b is an integer from about 5 to about 7), phosphoric acid ($H_3PO_4$), boric acid ($BH_3O_3$), a trifluoromethanesulfonimide having the structure

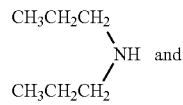

or two or more thereof.

The proton-conducting component can comprise a plurality of moieties or molecules. In one embodiment, in addition to the inorganic Brønsted acid moiety, the proton-conducting component further comprises a Brønsted base moiety. In a further embodiment, the proton-conducting component comprises (a) imidazole

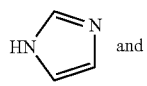

trifluoromethanesulfonimide, (b) dipropylamine

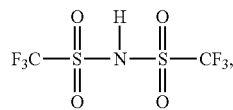

trifluoromethanesulfonimide, or both.

It may be desirable to immobilize the proton-conducting component in the polysesquioxane matrix. In one embodiment, the proton-conducting component is covalently bonded to the polysesquioxane matrix. The covalent bond can be to an atom of the metallic element or to an atom of an oxygen, Hydrocarbon, Aryl, Silyl, or other moiety bonded to an atom of the metallic element. In another embodiment, the proton-conducting component is vitrifiedly immobilized in the polysesquioxane matrix.

In one embodiment, wherein the proton-conducting component is covalently bonded to the polysesquioxane matrix, the proton-conducting component comprises a pendant sulfonic acid group having the structure

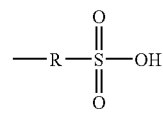

or a salt thereof, wherein R is an alkyl group having from 1 to about 10 carbon atoms, a halide-substituted alkyl group having from 1 to about 10 carbon atoms, an alkenyl group having from 1 to about 10 carbon atoms, a halide-substituted an alkenyl group having from 1 to about 10 carbon atoms, an alkynyl group having from 1 to about 10 carbon atoms, a halide-substituted an alkynyl group having from 1 to about 10 carbon atoms, an aryl-containing group having from 6 to about 20 carbon atoms, a halide-substituted aryl-containing group having from 6 to about 20 carbon atoms, a group containing an aromatic heterocyclic moiety and having from 6 to about 20 carbon atoms, or a halide-substituted group containing an aromatic heterocyclic moiety and having from 6 to about 20 carbon atoms. The unfilled valence represents a bond to the polysesquioxane matrix. In a further embodiment, the pendant sulfonic acid group comprises a phenyl moiety or a 1-butyl-3-methyl-imidazolium trifluoromethanyl moiety.

In another embodiment, wherein the proton-conducting component is covalently bonded to the polysesquioxane matrix, the proton-conducting component comprises a pendant phosphonic acid group having the structure

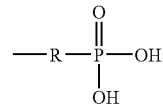

or a salt thereof, wherein R is an alkyl group having from 1 to about 10 carbon atoms, a halide-substituted alkyl group having from 1 to about 10 carbon atoms, an alkenyl group having from 1 to about 10 carbon atoms, a halide-substituted an alkenyl group having from 1 to about 10 carbon atoms, an alkynyl group having from 1 to about 10 carbon atoms, a halide-substituted an alkynyl group having from 1 to about 10 carbon atoms, an aryl-containing group having from 6 to about 20 carbon atoms, a halide-substituted aryl-containing group having from 6 to about 20 carbon atoms, a group containing an aromatic heterocyclic moiety and having from 6 to about 20 carbon atoms, or a halide-substituted group containing an aromatic heterocyclic moiety and having from 6 to about 20 carbon atoms. The unfilled valence represents a bond to the polysesquioxane matrix. In a further embodiment, R is phenyl.

As will be apparent to the skilled artisan having the benefit of the present disclosure, a particular component of the composition can function both as a hydrophilic component and as a proton-conducting component.

Figure 1:
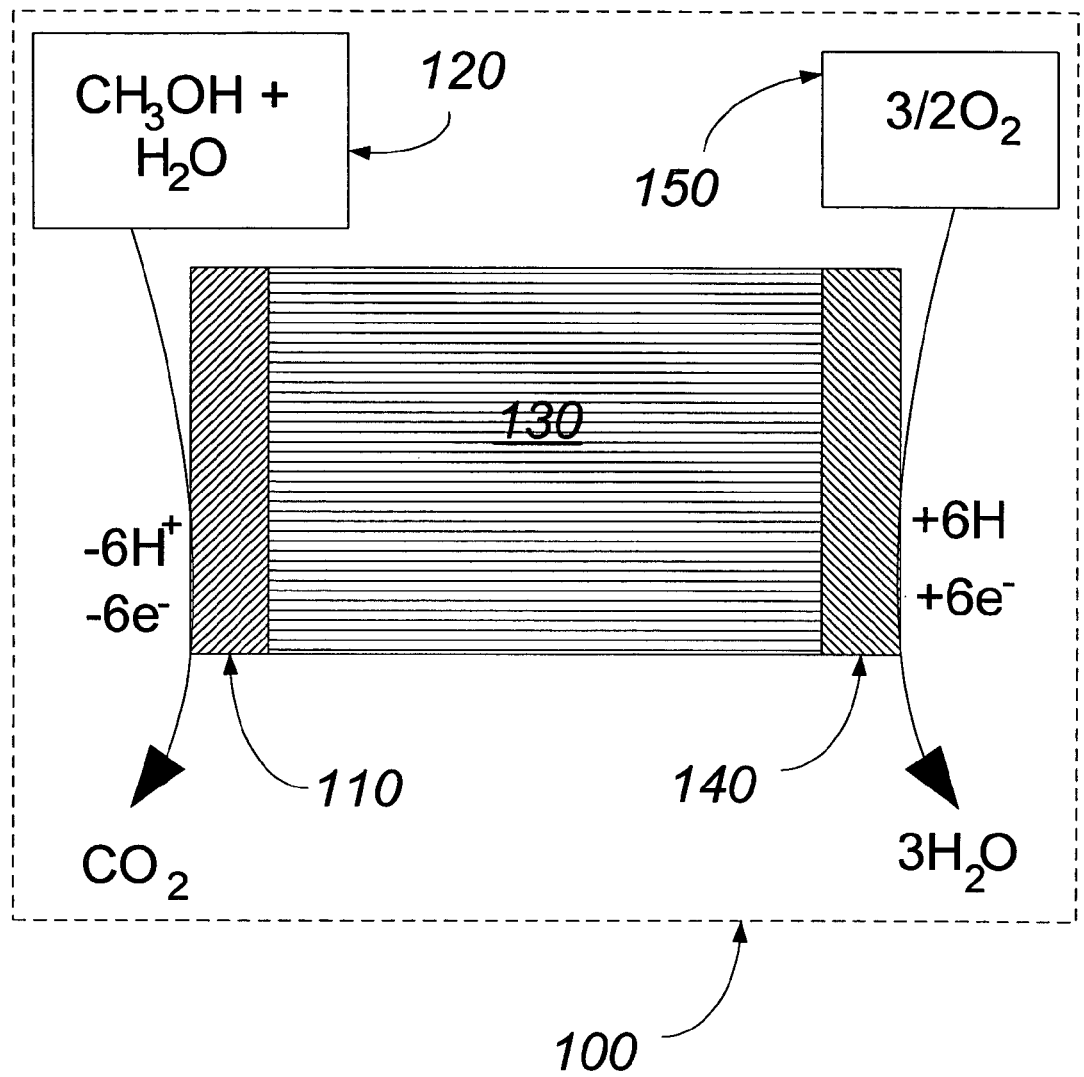
FIG. 1 shows a schematic representation of a fuel cell according to one embodiment of the present invention.

In another embodiment, the present invention relates to a fuel cell. Turning to FIG. 1, the fuel cell 100 comprises an anode 110. The anode 110 can be formed from any appropriate material as a routine matter for the skilled artisan having the benefit of the present disclosure. In one embodiment, the anode 110 is formed from platinum.

The anode 110 is the location at which a fuel, such as, in one embodiment, methanol or ethanol, is oxidized, if necessary, to generate protons and electrons, or at which hydrogen is ionized into protons and electrons. In FIG. 1, the fuel shown is methanol, but this is merely illustrative and is not limiting. The electrons can be fed through an external circuit (not shown) to perform electrical work.

Thus, the fuel cell 100 also comprises a fuel source 120 capable of feeding a fuel to the anode 110. Feeding can comprise passive techniques (such as diffusion or gravity-assisted flow within a conduit) or active techniques (such as the use of a pump or pumps for forcing liquid fuel, or the use of a blower for forcing gaseous fuel, to flow within a conduit) in any combination. Exemplary fuels include, but are not limited to, methanol, ethanol, hydrogen, or two or more thereof.

As stated, the anode 110 is the location where electrons are removed from the fuel material and fed through an external circuit (not shown). Protons generated by oxidation of a hydrocarbon fuel or ionization of hydrogen may be combined with the electrons after the latter have performed work to complete the circuit. Therefore, the fuel cell 100 also comprises a proton exchange membrane 130, comprising a polysesquioxane composition comprising: (i) a polysesquioxane matrix comprising sesquioxane moieties comprising a metallic element; (ii) a hydrophilic component; and (iii) a proton-conducting component.

The polysesquioxane composition can be as described above. In one embodiment, the metallic element is silicon, aluminum, titanium, zirconium, germanium, or a mixture of two or more thereof. In one embodiment, the hydrophilic component comprises an imidazole moiety, a pyrazole moiety, a benzimidazole moiety, a silanol moiety, a cyclodextrin, or two or more thereof. The hydrophilic component can be immobilized in the polysesquioxane matrix by covalent bonding to the polysesquioxane matrix or vitrified immobilization in the polysesquioxane matrix. In one embodiment, the proton-conducting component comprises an inorganic Brønsted acid moiety, and in a further embodiment, the proton-conducting component further comprises a Brønsted base moiety.

The proton exchange membrane 130 allows protons to travel from the anode 110 to the cathode 140. At the cathode 140, the protons are recombined with electrons in the presence of an oxidant. The cathode 140 can be formed from any appropriate material as a routine matter for the skilled artisan having the benefit of the present disclosure. In one embodiment, the cathode 140 is formed from platinum.

For recombination of protons and electrons to occur at the cathode 140, an oxidant is normally present. Thus, the fuel cell 100 further comprises an oxidant source 150 capable of feeding an oxidant to the cathode 140. Feeding can comprise passive techniques or active techniques in any combination, along the lines of the feeding of fuel to the anode, discussed above. The oxidant shown in FIG. 1 is oxygen, but this is illustrative and not limiting. Air is a convenient source of oxygen, but gaseous mixtures with higher or lower concentrations of oxygen, or with concentrations of other gases wherein the concentration differs from air, can be used, if desired.

The proton exchange membrane should readily conduct protons. In one embodiment, the proton exchange membrane has a proton conductivity greater than $0.01 \text{ S cm}^{-1}$. Though not to be bound by theory, Applicant suggests that the polysesquioxane matrix creates a mesoporous structure conducive to the lodgement of water molecules therein by hydrogen bonding between water and the hydrophilic component and the conduction of protons involving the proton-conducting component.

Also, the proton exchange membrane should have a low methanol permeability, which enhances the efficiency of methanol oxidation at the anode and reduces inefficiencies resulting from the presence of methanol at the cathode. In one embodiment, the proton exchange membrane has a methanol permeability coefficient, defined in terms of methanol crossover rate, of less than about $0.2 \text{ }\mu\text{moles min}^{-1}\text{ cm}^{-2}$.

The fuel cell can further comprise other components, such as user-accessible controls; a controller capable of implementing instructions embodied in software, hardware, or firmware; heating devices; cooling devices; or other components known to the skilled artisan for use in fuel cells.

The fuel cell can be suitable for use in stationary applications (such as relatively large batteries, standby power supplies, and the like), mobile applications (such as vehicle power), and portable applications (such as are commonly currently seen for batteries in laptop computer and cellular telephone power). The fuel cell of the present invention can be suitable for use at medium temperatures (from about 100° C. to about 250° C.). At least at medium temperatures, the proton exchange membrane of the fuel cell of the present invention has a high thermal stability relative to conventional commercially-available proton exchange membranes.

In another embodiment, the present invention relates to a membrane electrode assembly, comprising:

at least one proton exchange membrane layer comprising a polysesquioxane composition comprising: (i) a polysesquioxane matrix comprising sesquioxane moieties comprising a metallic element; (ii) a hydrophilic component; and (iii) a proton-conducting component; and at least one catalyzed electrode layer;

wherein either at least one proton exchange membrane layer is disposed between two catalyzed electrode layers or at least one catalyzed electrode layer is disposed between two proton exchange membrane layers.

The proton exchange membrane layer can be as described above. The catalyzed electrode layer can be substantially similar to the cathode or the anode described above. In one embodiment, the at least one catalyzed electrode layer comprises platinum. In another embodiment, the at least one catalyzed electrode layer comprises a non-noble metal.

In another embodiment, the present invention relates to a process for making a polysesquioxane composition, comprising:

reacting a sesquioxane precursor comprising a metallic element, to form a polysesquioxane matrix;

incorporating a hydrophilic component into the polysesquioxane matrix; and incorporating a proton-conducting component into the polysesquioxane matrix, to yield the polysesquioxane composition.

The sesquioxane precursor can be selected as a matter of routine experimentation by the skilled artisan having the benefit of the present disclosure. Generally, the sesquioxane precursor comprises a Metal-OH or a Metal-O-Alkyl moiety (wherein Alkyl is —$CH_3$, —$CH_2CH_3$, —$(CH_2)_2CH_3$, or the like), which can react under sol-gel conditions to form Metal-O-Metal linkages and water or an alcohol as a byproduct. If the metal is silicon, exemplary silsesquioxane precursors include, but are not limited to, benzyl triethoxysilane or monophenyl triethoxysilane, among others. This reaction can occur under conditions other than sol-gel conditions. Other moieties may react under sol-gel conditions or other reaction conditions as well, to create other linkages within the polysesquioxane matrix, such as Metal-Hydrocarbon-Metal linkages or Metal-Aryl-Metal linkages. These reactions can typically be carried out at relatively low temperatures (e.g., from about 15° C. to about 100° C.). The result of the reacting step is a polysesquioxane matrix.

A hydrophilic component, as described above, can be incorporated into the polysesquioxane matrix by one or more of a number of techniques. In one technique, the hydrophilic component is provided as a molecule comprising a hydrophilic component moiety and a leaving group, such as —OH or -Halide, and this molecule is mixed with the sesquioxane precursor and is present in the reacting step. In this technique, some Metal-O-hydrophilic component moiety linkages, Metal-Hydrocarbon-hydrophilic component moiety linkages, or Metal-Aryl-hydrophilic component moiety linkages may form, resulting in covalent bonding of the hydrophilic component to the polysesquioxane matrix.

In another technique, the hydrophilic component is provided as a hydrophilic component molecule that is relatively non-reactive under sesquioxane precursor reaction conditions, and mixed with the sesquioxane precursor. In this technique, the hydrophilic component can be non-covalently associated with the polysesquioxane matrix as the matrix is formed.

In a further technique, the hydrophilic component can be provided as a hydrophilic component molecule in a composition that is capable of impregnating a polysesquioxane matrix. Such a composition may be a solution capable of entering the pores of the matrix and transporting the hydrophilic component molecule thereto. In this technique, the hydrophilic component molecule can be incorporated into a pre-formed polysesquioxane matrix by contacting the matrix with the composition and subsequently removing composition components other than the hydrophilic component molecule from the matrix, such as by applying heat or vacuum to the polysesquioxane matrix to extract a solvent from the matrix.

Two or more of the foregoing techniques can be performed.

As will be apparent from the foregoing discussion, the step of incorporating the hydrophilic component can be performed simultaneously with or subsequent to the reacting step.

A proton-conducting component, as described above, can be incorporated into the polysesquioxane matrix by one or more of a number of techniques. In one technique, the proton-conducting component is provided as a molecule or molecules comprising a proton-conducting component moiety and a leaving group, such as —OH or -Halide, and this molecule is mixed with the sesquioxane precursor and is present in the reacting step. In this technique, some Metal-O-proton conductor moiety linkages, Metal-Hydrocarbon-proton conductor moiety linkages, or Metal-Aryl-proton conductor moiety linkages may form, resulting in covalent bonding of the proton-conducting component to the polysesquioxane matrix.

In another technique, the proton-conducting component is provided as a proton conductor molecule that is relatively non-reactive under sesquioxane precursor reaction conditions, and mixed with the sesquioxane precursor. In this technique, the proton-conducting component can be non-covalently associated with the polysesquioxane matrix as the matrix is formed.

In a further technique, the proton-conducting component can be provided as a proton conductor molecule in a composition that is capable of impregnating a polysesquioxane matrix. Such a composition may be a solution capable of entering the pores of the matrix and transporting the proton conductor molecule thereto. In this technique, the proton conductor molecule can be incorporated into a pre-formed polysesquioxane matrix by contacting the matrix with the composition and subsequently removing composition components other than the proton-conducting component molecule from the matrix, such as by applying heat or vacuum to the polysesquioxane matrix to extract a solvent from the matrix.

If the sesquioxane precursor comprised a Metal-benzyl or Metal-monophenyl moiety, the proton-conducting component can be incorporated by sulfonation or phosphonation of the Metal-benzyl or Metal-monophenyl moiety with chlorosulfonic acid, chlorophosphonic acid, or the like.

Two or more of the foregoing techniques can be performed.

As will be apparent from the foregoing discussion, the step of incorporating the proton-conducting component can be performed simultaneously with or subsequent to the reacting step and independently can be performed simultaneously with or subsequent to the step of incorporating the hydrophilic component.

Simultaneously or subsequently to the reacting step, the polysesquioxane composition can be processed into a desired shape. In one embodiment, the polysesquioxane composition is shaped by reaction of the sesquioxane precursor in a mold yielding the desired shape. In another embodiment, the polysesquioxane composition is shaped by solvent casting of the polysesquioxane matrix. In an additional embodiment, the polysesquioxane composition is shaped during the matrix-forming reaction by stamping and compression-molding the polysesquioxane composition into the desired shape and allowing polysesquioxane matrix formation to proceed. Polysesquioxane compositions of the present invention are generally readily processable prior to complete condensation and full cross-linked network formation.

In an additional embodiment, the present invention relates to a sensor, comprising:

a sensor assembly comprising a polysesquioxane composition comprising: (i) a polysesquioxane matrix comprising sesquioxane moieties comprising a metallic element; (ii) a hydrophilic component; and (iii) a proton-conducting component.

The polysesquioxane composition and its components can be as described above. The composition is capable of conducting protons, and can be used to qualify or quantify chemical species in the gas phase and signal that information by proton conduction.

The sensor can further comprise other components, such as user-accessible controls, a controller capable of implementing instructions encoded in software, hardware, or firmware, a reporting means for alerting the user of the presence or quantity of one or more chemical species in the gas phase, or other components known to the skilled artisan for use in sensors.

The following examples are included to demonstrate advantageous embodiments of the invention. It should be appreciated by those of skill in the art that the techniques disclosed in the examples that follow represent techniques discovered by the inventor to function well in the practice of the invention, and thus can be considered to constitute advantageous modes for its practice. However, those of skill in the art should, in light of the present disclosure, appreciate that many changes can be made in the specific embodiments that are disclosed and still obtain a like or similar result without departing from the spirit and scope of the invention.

EXAMPLE 1

Mesoporosity of Organic-Inorganic Hybrid Polysesquioxane Matrix Systems

Herein is reported a generalized approach to chemically induce material porosity in organic-inorganic hybrid polysesquioxane matrix systems, based on controlled incorporation of so-called "bulky cage" cyclic and large ring skeletal substituents within the polysesquioxane matrix. Systematic incorporation of such nanostructured templates is demonstrated to result in mesopores (void inclusions from about 4 nm to about 40 nm diameter). Though not to be bound by theory, two mechanisms for mesopore formation are postulated: (a) increased intramolecular free volume resulting from the included void fraction within the skeletal cage structure; (b) increased intermolecular free volume resulting from decreased chain packing efficiency (i.e. higher density of microstructural network perturbations) due to the bulkiness of the introduced cage substituent. Results from various multicomponent polymer architectures with two independent "bulky-cage" model systems derived from POSS (Polyhedral Oligomeric Silsesquioxane) chemistry with cage length of about 15 Å, and β-Cyclodextrin chemistry with cage length of about 7 Å, demonstrate the approach is generic and readily effective as a route to control the porosity of inorganic-organic hybrid material systems.

The two mechanisms for mesoporosity were demonstrated by tests with model systems, such as POSS-styrene, wherein POSS is represented by

and x and 100-x are percentages of each type of unit in the polymer:

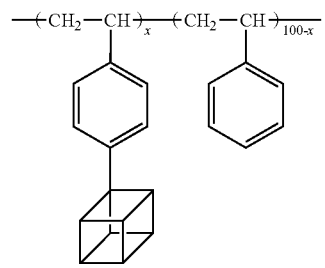

Figure 3:
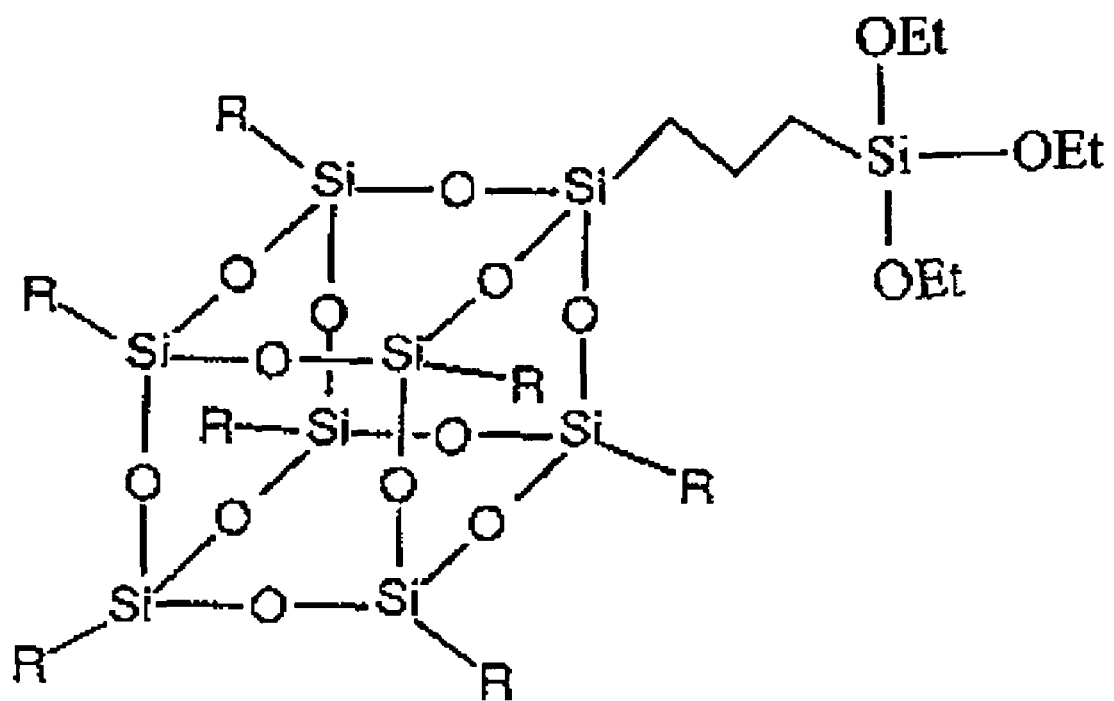
FIG. 3 shows a structural formula of a triethoxysilyl-terminated POSS.
Figure 4:
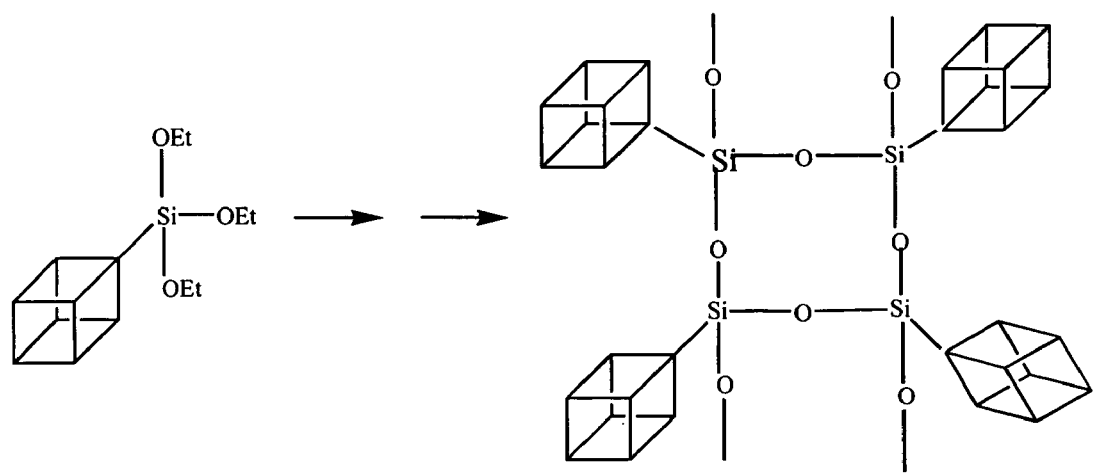
FIG. 4 shows a formula for the synthesis of a polysilsesquioxane matrix starting from a triethoxysilyl-terminated POSS.

Alkoxy-terminated POSS compounds, such as that shown in FIG. 3, can be used, analogously to alkoxysilanes, in sol-gel synthesis of a polysilsesquioxane matrix.

The three cyclodextrins (CD), α-, β-, and γ-, were also tested. The properties of these three compounds are as follows:

|  | α-CD | β-CD | γ-CD |
| --- | --- | --- | --- |
| Glucose subunits | 6 | 7 | 8 |
| Diameter | 0.45 nm | 0.7 nm | 0.85 nm |
| Depth | 0.67 nm | 0.7 nm | 0.7 nm |

Figure 5:
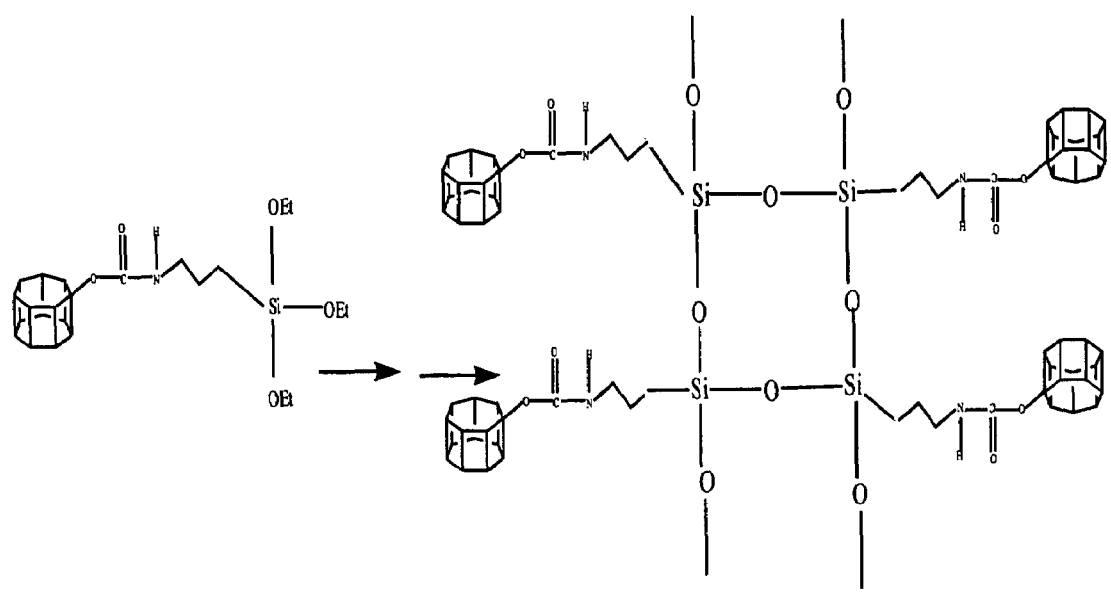
FIG. 5 shows a formula for the synthesis of a polysilsesquioxane matrix starting from a triethoxysilyl-terminated cyclodextrin.

Alkoxy-terminated cyclodextrins were generated by reacting the cyclodextrin with $OCN(CH_2)_3Si(OEt)_3$ in DMF for 16-24 hr, 70° C. The alkoxy-terminated cyclodextrins were used in sol-gel chemistry to generate an inorganic-organic network, as shown in part in FIG. 5.

Figure 6:
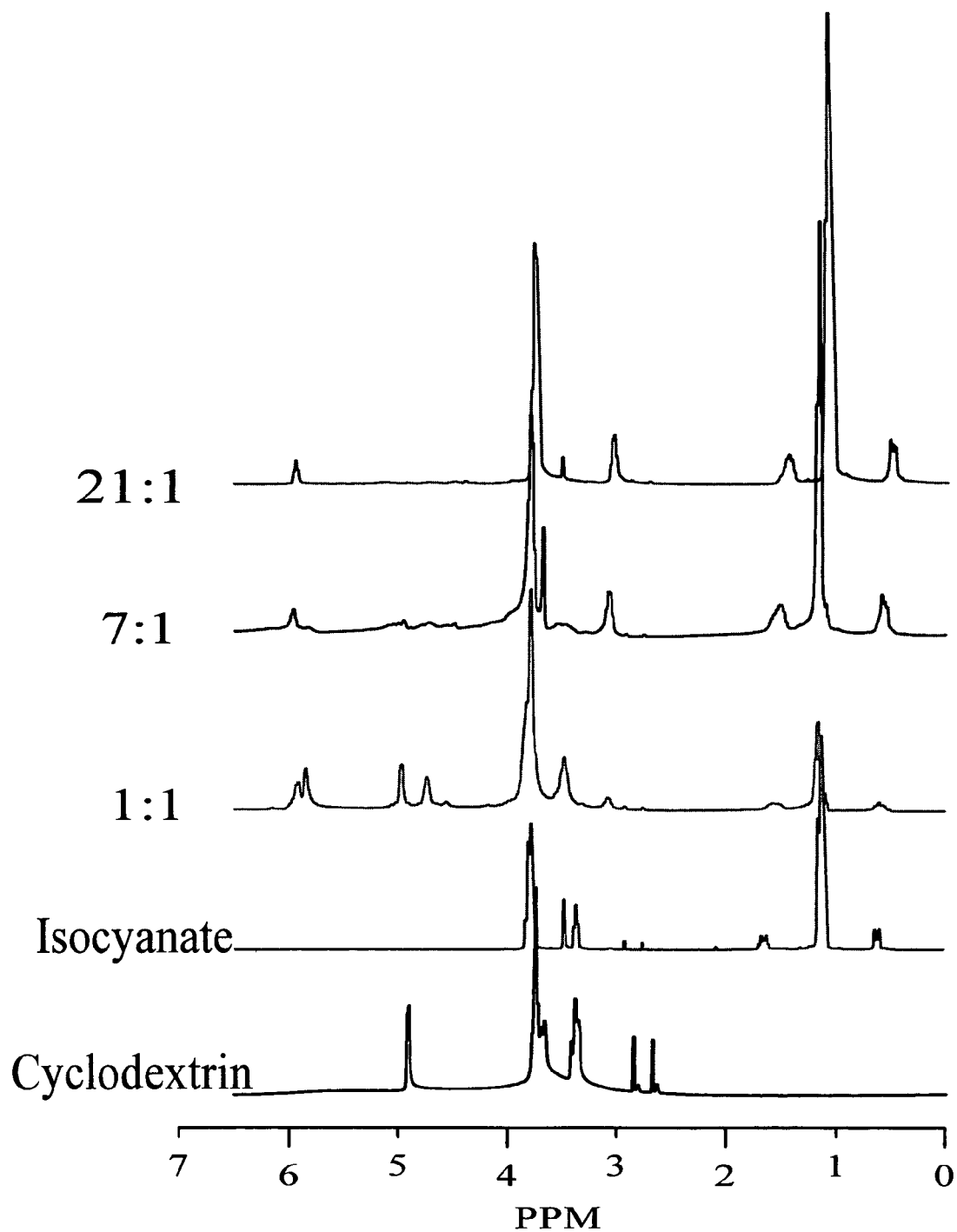
FIG. 6 shows NMR data demonstrating the alkoxy-termination reaction of the cyclodextrins used in FIG. 5.

FIG. 6 shows NMR data demonstrating alkoxy-termination reaction of the cyclodextrins. The number ratios correspond to the isocyanate:cyclodextrin molar ratio in the alkoxy termination reaction, and hence the number of termination sites on the cyclodextrin ring.

Figure 7:
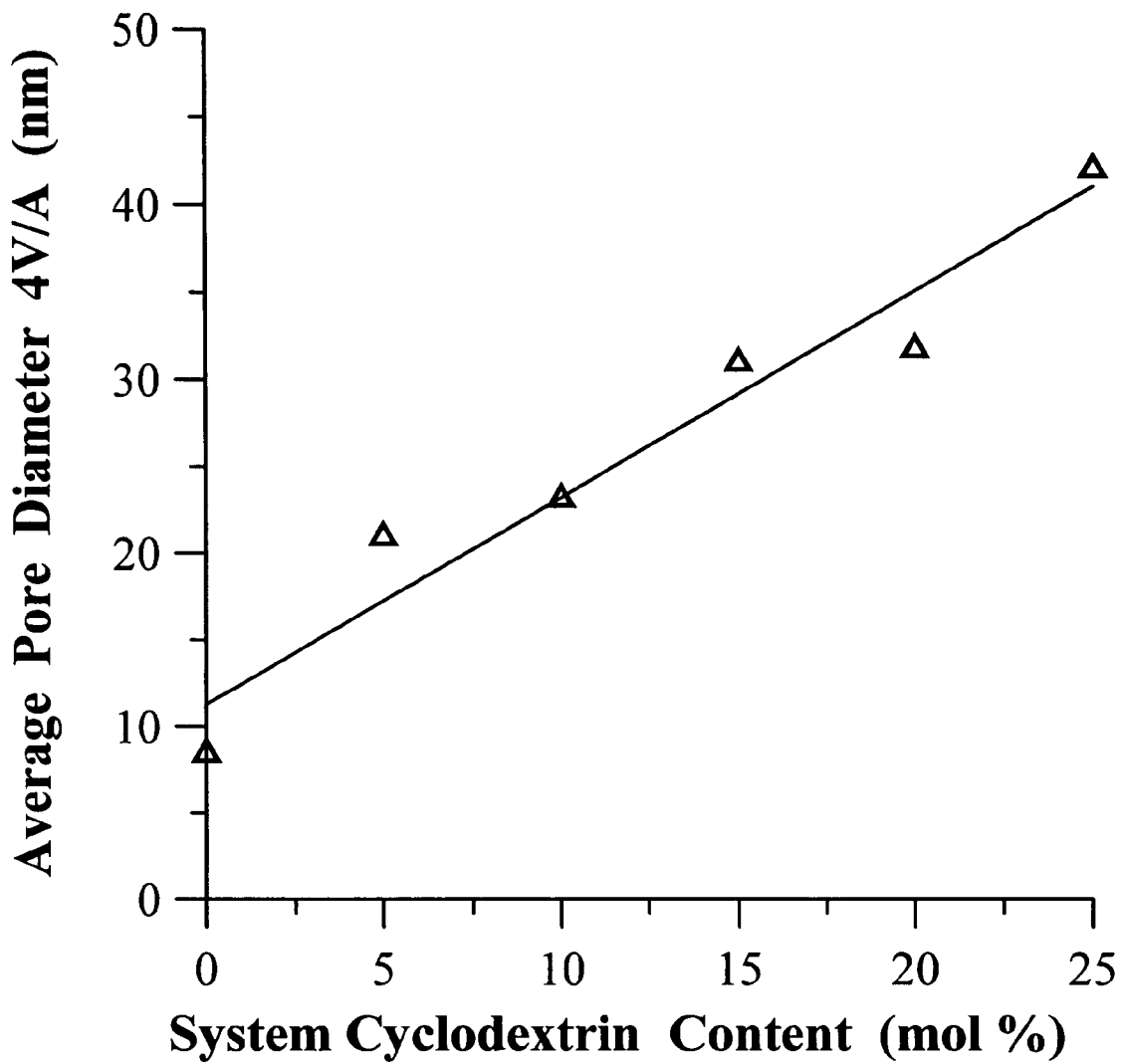
FIG. 7 is a graph of the average pore diameter of a polysilsesquioxane matrix comprising a cyclodextrin, as a function of cyclodextrin content of the polysilsesquioxane matrix, according to Example 1.
Figure 8:
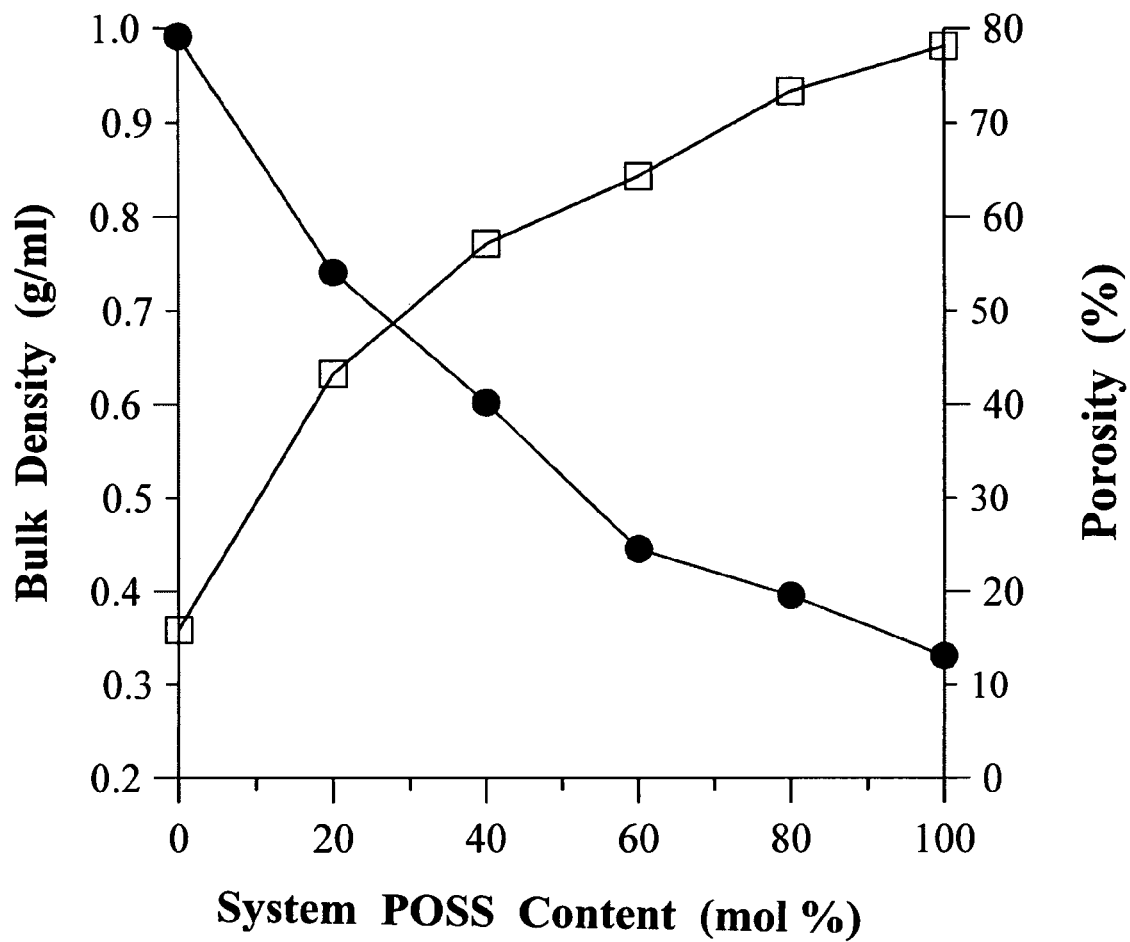
FIG. 8 is a graph of the bulk density (filled circles) and porosity (open squares) of a polysilsesquioxane matrix comprising a POSS, as a function of POSS content of the polysilsesquioxane matrix, according to Example 1.
Figure 9:
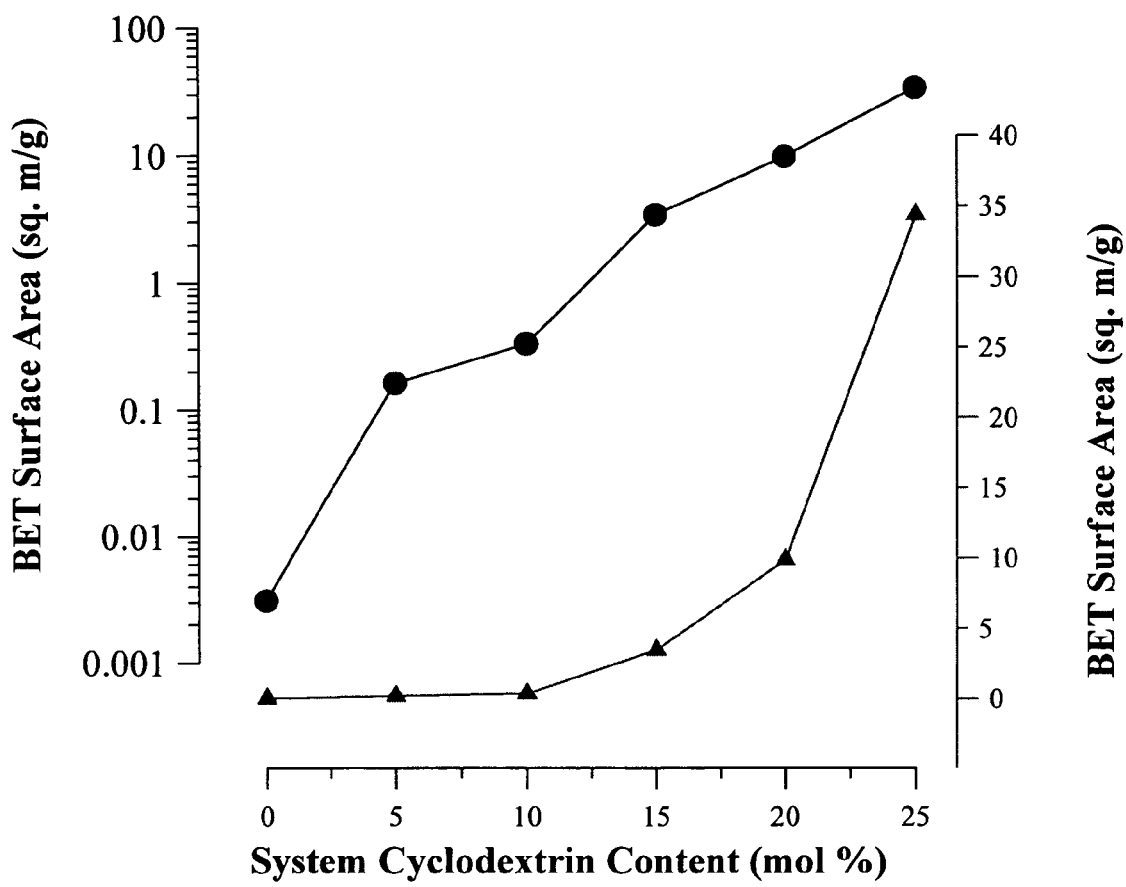
FIG. 9 is a graph of the BET surface area (filled circles, log scale; filled triangles, linear scale) of a polysilsesquioxane matrix comprising a cyclodextrin, as a function of cyclodextrin content of the polysilsesquioxane matrix, according to Example 1.

FIGS. 7-9 show graphs of various porosity measures (average pore diameter, porosity %, bulk density, and surface area) as a function of cyclodextrin or POSS content. FIG. 7 is a graph of the average pore diameter of a polysilsesquioxane matrix comprising a cyclodextrin, as a function of cyclodextrin content of the polysilsesquioxane matrix. FIG. 8 is a graph of the bulk density (filled circles) and porosity (open squares) of a polysilsesquioxane matrix comprising a POSS, as a function of POSS content of the polysilsesquioxane matrix. FIG. 9 is a graph of the BET surface area (filled circles, log scale; filled triangles, linear scale) of a polysilsesquioxane matrix comprising a cyclodextrin, as a function of cyclodextrin content of the polysilsesquioxane matrix.

The alkoxy-terminated POSS and alkoxy-terminated cyclodextrin were also combined with other known sesquioxane/silsesquioxane precursors (e.g., monophenyltriethoxysilane) and subsequently reacted under sol-gel conditions to form the multicomponent polysesquioxane/polysilsesquioxane.

EXAMPLE 2

Procedure for Preparation

The molecular structure of multicomponent composite systems can be systematically designed and engineered to control the thermal stability, protonic conductivity and other material properties.

Mechanically-robust glassy materials were formed from the hydrolysis and condensation of substituted alkoxysilanes and other precursor molecules for these systems with analogous sol-gel polymerization chemistry. The resultant material structure was a chemically cross-linked mesoporous interconnected network of nanophase inorganic and organic domains. The material thus generated was engineered for proton conductivity via introduction of acidic moieties either as mobile and/or immobilized acid dopants, or conversely as chemically-bound acid groups within the macromolecular network structure.

Procedure for Preparation of Sol-Gel Monomer Precursors (a): Preparation of di-triethoxysilyl Bridged Compound of 2,2,3,3,4,4,5,5-octafluoro-1,6-hexanediol-bis(3-triethoxysilyl)propyl Carbamate Several grams each of 2,2,3,3,4,4,5,5 octafluoro-1,6-hexanediol and (3-isocyanatopropyl)triethoxysilane were thoroughly purified by multi-stage vacuum distillation to a purity exceeding 99% by weight. About 1 g or 3.8 millimoles (mmol) of 2,2,3,3,4,4,5,5 octafluoro-1,6-hexanediol was placed inside a round bottom flask with toluene as a solvent. About 1.9 g or 4.3 mmol of (3-isocyanatopropyl)triethoxysilane was dropwise added to the flask. The reaction was allowed to take place over seven days at about 25° C. without any catalyst. The product, 2,2,3,3,4,4,5,5-octafluoro-1,6-hexanediol-bis(3-triethoxysilyl)propylcarbamate, was analyzed and found to be 98.6% pure, then refrigerated.

(b): Polymerization of Bridged Polysilsesquioxane Precursor Molecule

The polysilsesquioxane matrix system from the precursor molecule discussed above was produced by condensation of 2,2,3,3,4,4,5,5-octafluoro-1,6-hexanediol-bis(3-triethoxysilyl)propyl carbamate in the presence of selected cyclodextrin-terminated alkoxy compounds and the bulky POSS-terminated alkoxy compounds (in a 2:1 molar ratio) to promote co-condensation with the carbamate. THF was thoroughly dried by distillation with stirring for several days using potassium as a drying agent. The carbamate monomer in about a 0.4 molar concentration were then mixed into THF with addition of 5% molar equivalent of the cyclodextrin/POSS alkoxy molecules (in a 2:1 ratio) in alcohol solution. The condensation was catalyzed via hydrochloric acid or sodium hydroxide, with about a six-fold stoichiometric excess of water. The resultant sols were then solvent cast to form thin films and then left to gel at approximately 35° C. After gelation, the bridged polysilsesquioxane multi-component systems were initially dried and then annealed under nitrogen at successively increasing temperatures ranging up to about 125° C. over two weeks.

(c): Preparation of di-triethoxysilyl Precursor Monomer Molecules

Monomers containing the exemplary organic moiety and terminated with —Si(OC$_2$H$_5$)$_3$ groups can be used to synthesize a corresponding polysilsesquioxane matrix system. For example, in order to prepare such monomers, comprising for instance Cyclodextrin, or POSS or the fluorinated bridged systems, the analogous alkoxysilane terminated precursor molecule was generated from the required precursors. For an appropriate bridged polysilsesquioxane precursor molecule for example, the following typical procedure, incorporating α,α,α,α-tetrakis(trifluoromethyl)-1,3-benzene-dimethanol and (3-isocyanatopropyl)triethoxysilane was used. The former compound is commercially available from Lancaster Synthesis, and the latter compound is commercially available from Sigma-Aldrich. The reagents were purified in the same manner as in (a) above. About 1 g or 2.43 mmol of α,α,α,α-tetrakis(trifluoromethyl)-1,3-benzene-dimethanol was placed inside a round bottom flask. Next, about 2.1 g or 4.86 mmol of (3-isocyanatopropyl)triethoxysilane was dropwise added to the flask. Toluene was added to aid mixing of the two compounds. The reaction yielded the desired di-triethoxysilyl compound. This reaction was highly exothermic and was allowed to take place at room temperature or about 25° C. without any catalyst. The reaction was sluggish and a long reaction time, for example as long as seven days, was necessary for its completion. The product was refrigerated to prevent premature hydrolysis of the ethoxysilyl groups and resulting polymerization.

Figure 16:
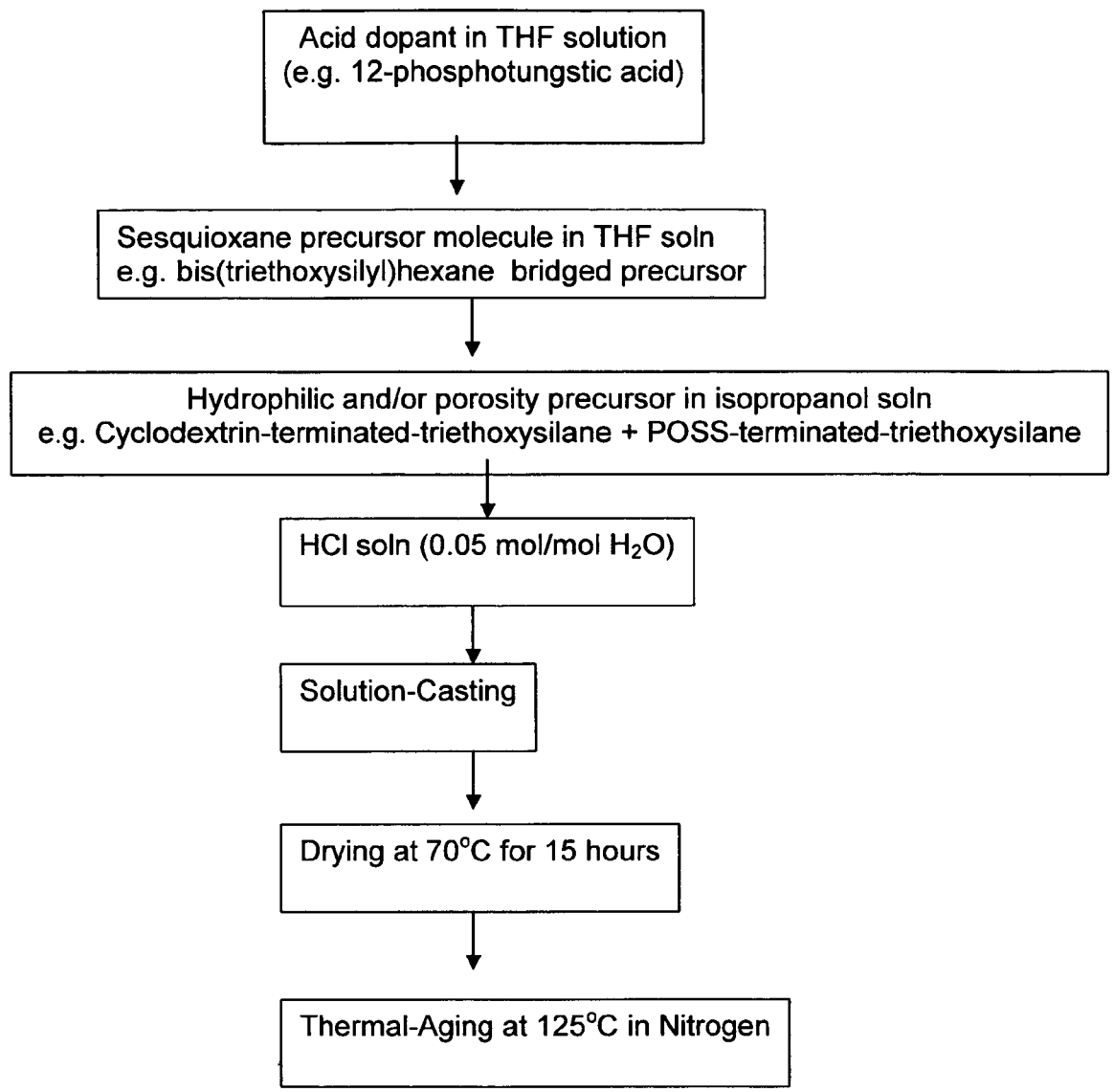
FIG. 16 shows the materials preparation procedure utilized for generation of the functional multicomponent materials.

FIG. 16 shows the materials preparation procedure utilized for generation of the functional multicomponent materials.

In one specific example, the acid dopant (12-phosphotungstic acid) was dissolved in THF (at 1 g/cc) and mixed dropwise with a solution of the sesquioxane precursor molecule (bis(triethoxysilyl)hexane) in THF. After complete mixing, then the alkoxysilane terminated hydrophilic compound (cyclodextrin) in isopropanol solution was added dropwise with vigorous stirring to the above solution. The resulting mixture was heated with stirring to 70° C. and a catalytic amount of HCl solution (stoichiometric such that one mole of alkoxy groups is catalysed by 0.02 mole of HCl per mole H$_2$O). The hydrolysis-condensation reaction of the alkoxy groups was permitted to occur until significant viscosity increase and then films were solvent cast onto Teflon plates and residual solvent was allowed to evaporate slowly. The cast films were further annealed under inert atmosphere (Nitrogen) to enable further polymer reaction and network formation. The resultant free-standing homogeneous material films, were then ultimately recovered for analytical characterization, evaluation and testing.

EXAMPLE 3

Performance of Fuel Cells Comprising Polysilsesquioxane Matrix/Cyclodextrin/12-Phosphotungstic Acid Proton Exchange Membrane Material systems were generated and processed utilizing the chemistry and procedures discussed above to yield proton exchange membranes to be used in fuel cell performance assays. The proton exchange membranes of this example comprised polysilsesquioxane matrices, as described below; cyclodextrin; and 12-phosphotungstic acid as the proton conductor component. The proton exchange membranes were designated as follows:

1-CD-Bridge: denotes a composite material incorporating cyclodextrin with nonfluorinated-organic-bridged polysilsesquioxane derived from hexyl-bridged silsesquioxane precursor monomer;

1-CD-F-Bridge: denotes composite material incorporating cyclodextrin with fluorinated organic-bridged polysilsesquioxane derived from carbamate-bridged precursor monomer;

2-CD-F-Bridge: denotes composite material incorporating cyclodextrin with fluorinated organic-bridged polysilsesquioxane derived from carbamate-bridged precursor monomer, where the cyclodextrin content was a factor of 2 higher (on mole basis) than the 1-CD-F-Bridge material.

Fuel cells comprising a proton exchange membrane were assembled by conventional techniques.

Figure 10:
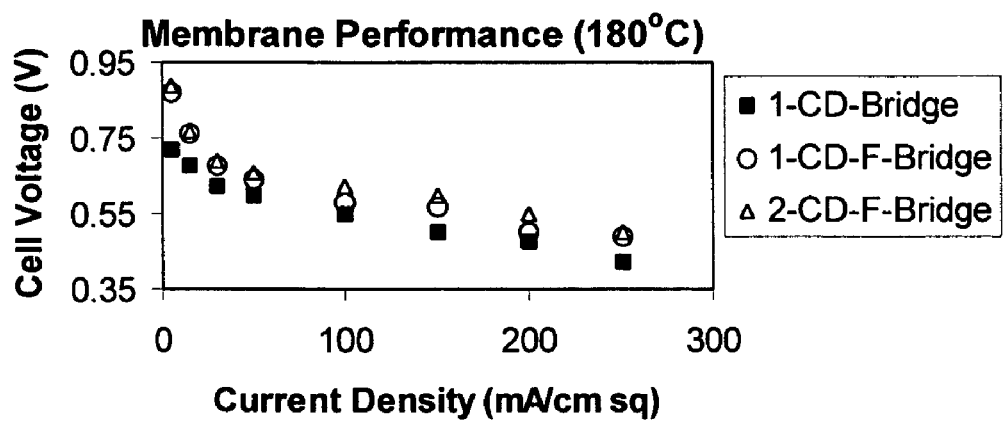
FIG. 10 is a graph of cell voltage as a function of current density, at 180° C., for fuel cells comprising proton exchange membranes formed from one of three different polysilsesquioxane matrices, according to Example 3.
Figure 11:
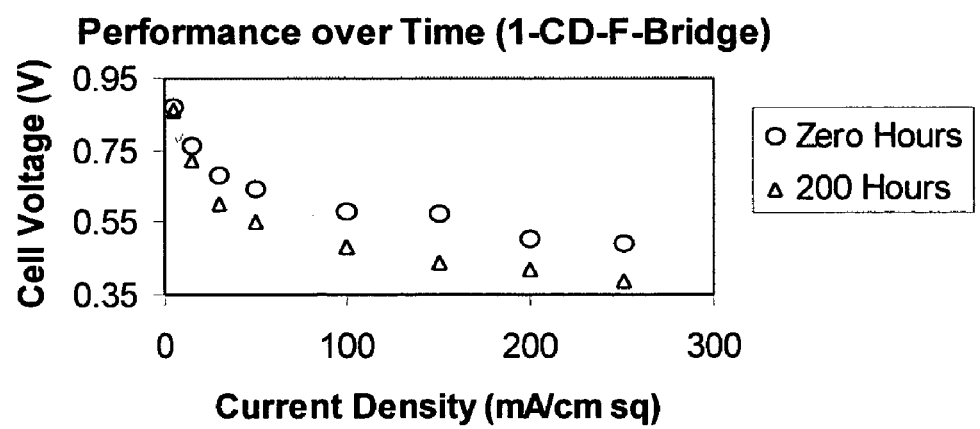
FIG. 11 is a graph of cell voltage as a function of current density, after 0 hr and 200 hr use, for a fuel cell comprising a proton exchange membrane formed from a polysilsesquioxane matrix, according to Example 3.

The electrical performance of various systems is displayed below. The fluorinated materials demonstrated superior conductivity characteristics relative to the non-fluorinated materials (FIG. 10). In terms of long term performance at the elevated operating temperatures, there was a slight degradation observed after 200 hours of operation (FIG. 11). Methanol crossover was significantly enhanced over that of a conventional Nafion-Silica composite control material, as demonstrated with the tabulated data below.

Methanol Cross-Over

| Material under evaluation (thickness in μm) | Methanol Crossover Limiting Current (mA/cm²) |
| --- | --- |
| Nafion115-Silica Composite (120) CONTROL | 84 |
| 1-CD-Bridge Composite (130) | 33 |
| 1-CD-F-Bridge Composite (134) | 29 |
| 2-CD-F-Bridge Composite (122) | 38 |

EXAMPLE 4

Performance of Fuel Cells Comprising Sulfonated Polysilsesquioxane Matrix/Hydrophilic Component Proton Exchange Membrane Material systems were generated and processed utilizing the chemistry and procedures discussed earlier.

The nomenclature below refers to material systems where the proton conductor component was introduced via sulfonation at the phenyl ring covalently-bound to the polysilsesquioxane network structure.

The composite system here was derived from monophenyltriethoxysilane (a non-bridged precursor monomer), POSS-ethoxysilane-terminated precursor, and cyclodextrin-ethoxysilane-terminated precursor reacted in homogeneous solution at 3:2:1 molar composition ratio. After a sol-gel network formed, sulfonation was carried out to different extents at the aromatic ring (phenyl substitution) utilizing well-known techniques.

Figure 12:
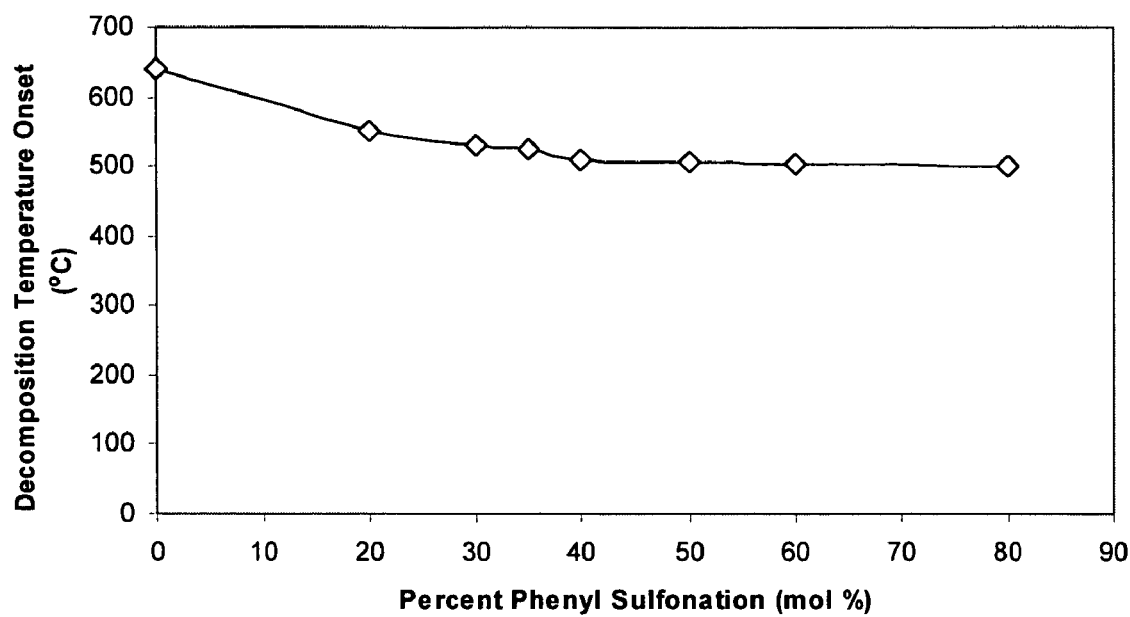
FIG. 12 is a graph of decomposition onset temperature as a function of phenyl sulfonation level for a proton exchange membrane formed from a polysilsesquioxane matrix, according to Example 4.
Figure 13:
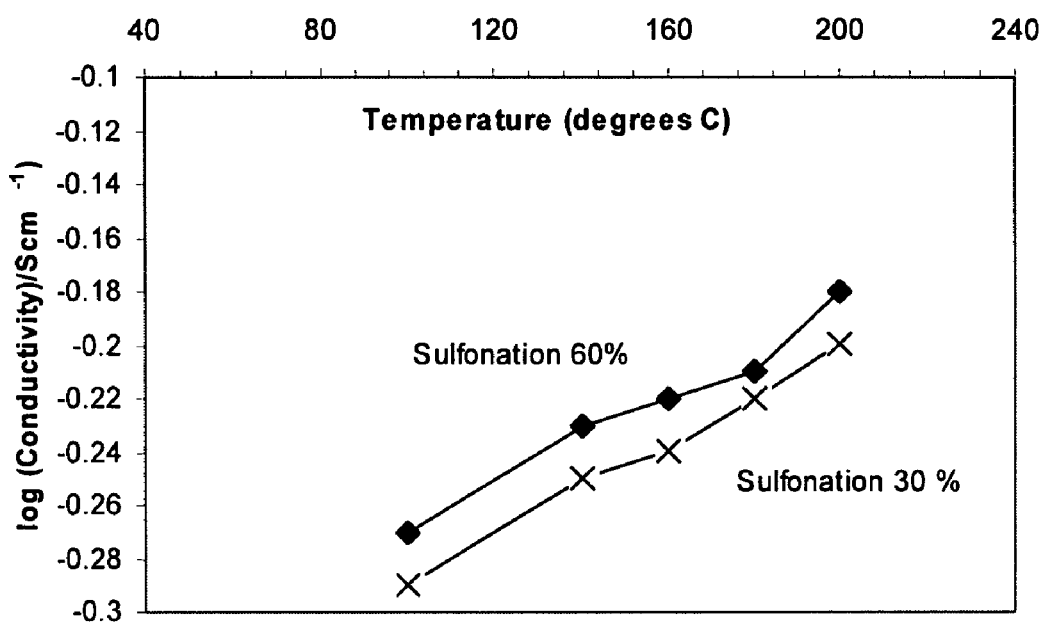
FIG. 13 is a graph of conductivity as a function of temperature for proton exchange membranes formed from phenylsulfonated polysilsesquioxane matrices, according to Example 4.
Figure 14:
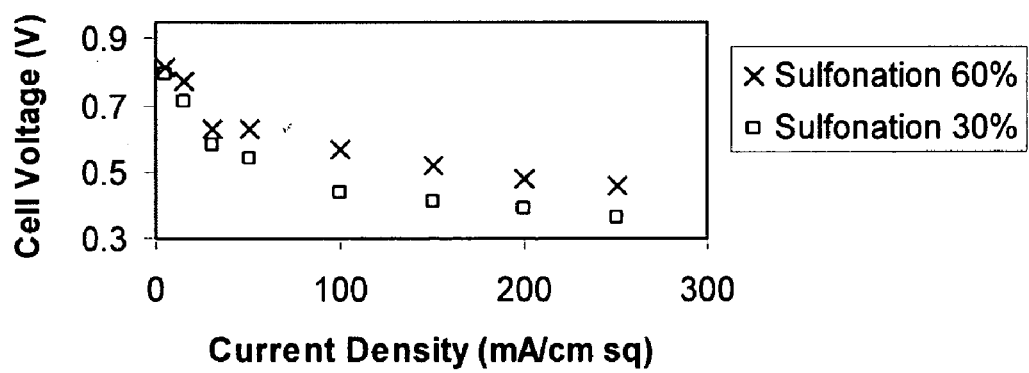
FIG. 14 is a graph of cell voltage as a function of current density for a fuel cell comprising a proton exchange membrane formed from phenylsulfonated polysilsesquioxane matrices, according to Example 4.
Figure 15:
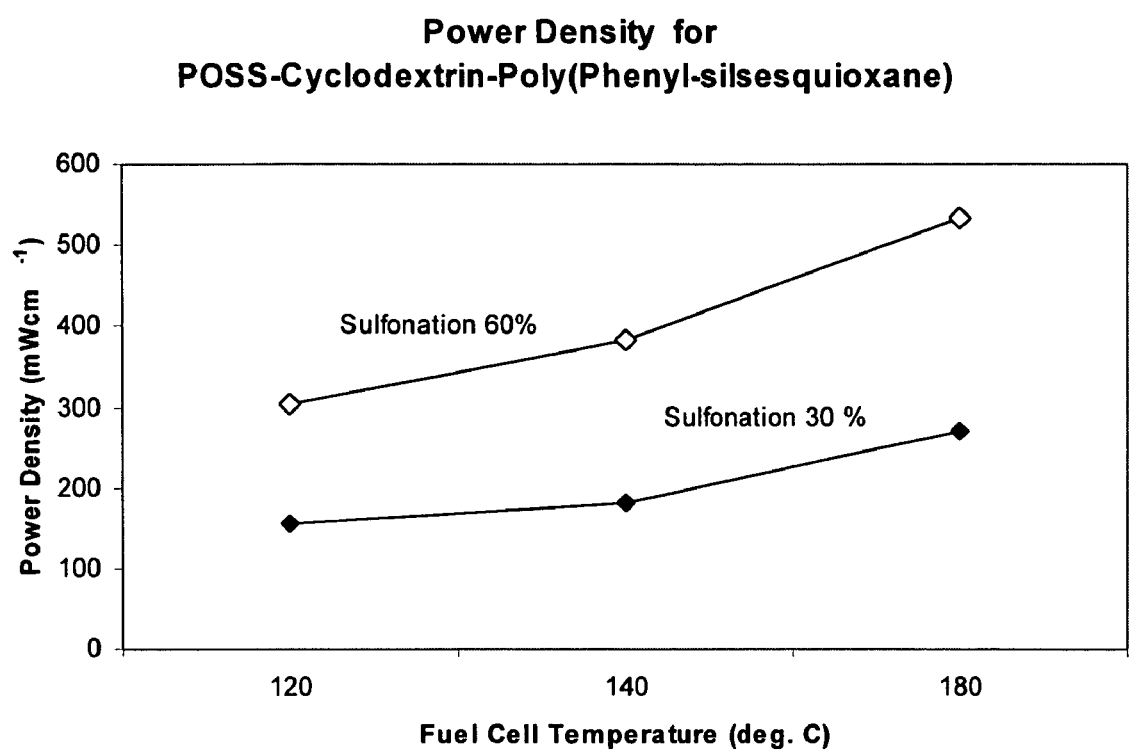
FIG. 15 is a graph of power density as a function of fuel cell temperature for a fuel cell comprising a proton exchange membrane formed from phenylsulfonated polysilsesquioxane matrices, according to Example 4.

The thermal and electrical performance of various systems was evaluated as displayed below (FIGS. 12-15). FIG. 12 is a graph of decomposition onset temperature as a function of phenyl sulfonation. FIG. 13 is a graph of conductivity as a function of temperature. FIG. 14 is a graph of cell voltage as a function of current density. FIG. 15 is a graph of power density as a function of fuel cell temperature.

All of the compositions, methods, and apparatus disclosed and claimed herein can be made and executed without undue experimentation in light of the present disclosure. While the compositions, methods, and apparatus of this invention have been described in terms of advantageous embodiments, it will be apparent to those of skill in the art that variations may be applied to the compositions, methods, and apparatus and in the steps or in the sequence of steps of the methods described herein without departing from the concept, spirit and scope of the invention. More specifically, it will be apparent that certain agents that are chemically related may be substituted for the agents described herein while the same or similar results would be achieved.

I claim:

1. A proton exchange membrane layer, comprising a polysesquioxane composition comprising: a polysesquioxane matrix comprising sesquioxane moieties comprising a metallic element; a hydrophilic component; and a proton-conducting component.

2. The proton exchange membrane layer of claim 1, wherein the proton exchange membrane layer is used in a fuel cell, the fuel cell comprising:
   an anode;
   a fuel source capable of feeding a fuel to the anode;
   a proton exchange membrane comprising a polysesquioxane composition comprising: a polysesquioxane matrix comprising sesquioxane moieties comprising a metallic element; a hydrophilic component; and a proton-conducting component;
   a cathode; and
   an oxidant source capable of feeding an oxidant to the cathode.

3. The fuel cell of claim 2, wherein the anode and the cathode comprise platinum.

4. The fuel cell of claim 2, wherein the fuel is hydrogen, methanol, ethanol, or a mixture of two or more thereof.

5. The fuel cell of claim 2, wherein the oxidant is air.

6. The fuel cell of claim 2, wherein the proton exchange membrane has a proton conductivity greater than 0.01 S cm$^{-1}$.

7. The proton exchange membrane layer of claim 1, wherein the proton exchange membrane layer is used in a membrane electrode assembly, the membrane electrode assembly comprising:
   at least one proton exchange membrane layer comprising a polysesquioxane composition comprising: a polysesquioxane matrix comprising sesquioxane moieties comprising a metallic element; a hydrophilic component; and a proton-conducting component; and
   at least one catalyzed electrode layer;
   wherein either at least one proton exchange membrane layer is disposed between two catalyzed electrode layers or at least one catalyzed electrode layer is disposed between two proton exchange membrane layers.

8. The membrane electrode assembly of claim 7, wherein the at least one catalyzed electrode layer comprises platinum.

9. The membrane electrode assembly of claim 7, wherein the at least one catalyzed electrode layer comprises a non-noble metal.

10. The proton exchange membrane layer of claim 1, wherein the polysesquioxane matrix further comprises at least one substituent selected from the group consisting of polyhedral oligomeric silsesquioxanes, cyclodextrins, and two or more thereof.

11. The proton exchange membrane layer of claim 10, wherein the at least one substituent selected from the group consisting of polyhedral oligomeric silsesquioxanes, cyclodextrins, and two or more thereof is immobilized in the polysesquioxane matrix.

12. The proton exchange membrane layer of claim 11, wherein the at least one substituent selected from the group consisting of polyhedral oligomeric silsesquioxanes, cyclodextrins, and two or more thereof is covalently bonded to the polysesquioxane matrix.

13. The proton exchange membrane layer of claim 10, wherein the at least one substituent is a polyhedral oligomeric silsesquioxane with a concentration from 20 mol % to 100 mol %.

14. The proton exchange membrane layer of claim 10, wherein the at least one substituent is a cyclodextrin with a concentration from 5 mol % to 25 mol %.

15. The proton exchange membrane layer of claim 2, wherein the polysesquioxane matrix further comprises at least one substituent selected from the group consisting of polyhedral oligomeric silsesquioxanes, cyclodextrins, and two or more thereof.

16. The proton exchange membrane layer of claim 7, wherein the polysesquioxane matrix further comprises at least one substituent selected from the group consisting of polyhedral oligomeric silsesquioxanes, cyclodextrins, and two or more thereof.

* * * * *